Oct. 21, 1952  J. D. BARNARD ET AL  2,614,378
CORN HARVESTER
Filed Aug. 4, 1949  2 SHEETS—SHEET 1

Inventors
JOHN D. BARNARD,
& ALTON LEVERSON,
By Mason, Porter, Diller & Stewart
ATTORNEYS Oct. 21, 1952     J. D. BARNARD ET AL     2,614,378
CORN HARVESTER
Filed Aug. 4, 1949     2 SHEETS—SHEET 2
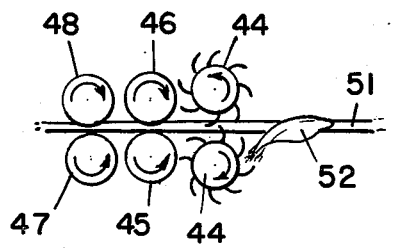
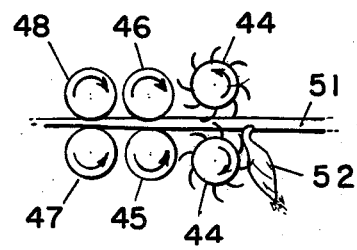
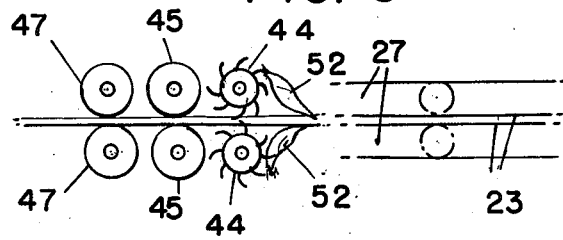
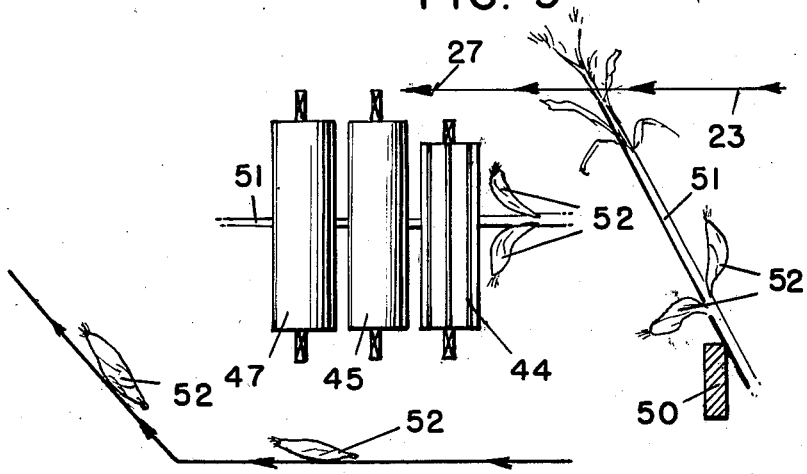
Inventors
JOHN D. BARNARD,
& ALTON LEVERSON,
ATTORNEYS Patented Oct. 21, 1952

2,614,378

UNITED STATES PATENT OFFICE 2,614,378

CORN HARVESTER

John D. Barnard and Alton Leverson, Le Sueur, Minn., assignors to Green Giant Company, a corporation of Minnesota Application August 4, 1949, Serial No. 108,557

3 Claims. (Cl. 56—107)

The invention described in detail in the following specification relates to sweet corn harvesters. In the field harvesting of sweet corn by mechanical means, the ears must be removed from the stalks with a minimum of force, in order to prevent bruising the ears or breaking the soft kernels. Machines have been developed for this general purpose, but their practical operation is subject to uncertainty in results. This is due to the fact that the stalks are carried past the snapping rollers without particular provision to maintain the stalks in the desired position relative to the rollers.

Where the stalks are free to swing laterally with respect to the snapping rollers, the engagement is not always effective to remove the ears. In fact, there is great likelihood that the stalks and ears will be presented in such manner as to clog the machine. This not only interferes with efficient operation, but also damages a relatively large proportion of the ears being harvested, thus leading to a product of lower grade than necessary.

We have found that it is possible to insure presentation of the stalks and ears to the snapping rollers in the most effective position for removal of the ears without damage.

We simulate hand operation in that the stalks are held relatively stationary while the ears are twisted off or snapped in a transverse position. There is thus less likelihood of the stalks being broken above the ears. This prevents clogging the machine and deterioration of the ears being harvested.

For the purpose of better illustrating the preferred mode of carrying out our invention, we have shown it in the accompanying drawings in which:

Fig. 6 is a diagrammatic plan view of the snapping means as the stalk advances and before the ear is snapped off;

Fig. 7 is a similar view showing final removal of the ear;

Fig. 8 is a schematic plan view of the manner of feeding the snapping device, and Fig. 9 is a schematic side elevation of the same.

Figure 1:
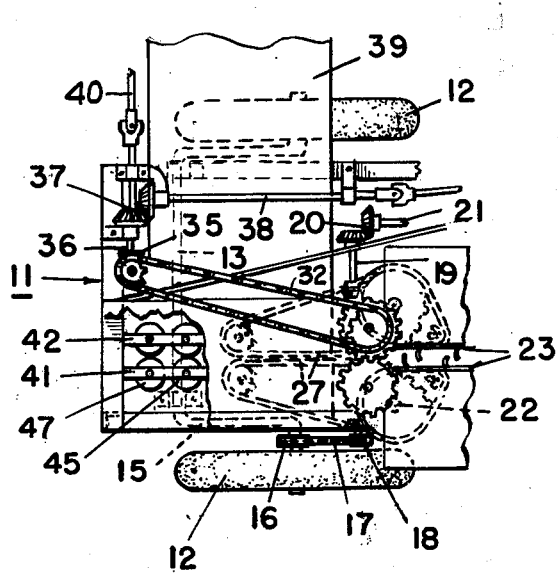
Fig. 1 is a plan view of a corn harvester equipped with the improved device.
Figure 3:
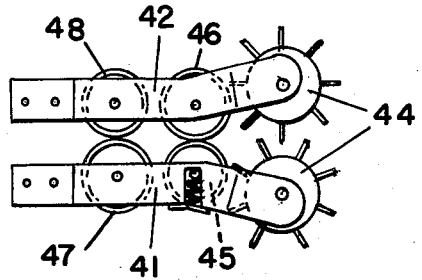
Fig. 3 is an enlarged horizontal partial cross-section of the ear-snapping means taken on line 3—3 of Fig. 2.

Our novel improvement is readily adapted to any harvesting machine operating through the use of a pair of opposed snapping rollers between which the stalk and ears are advanced. As illustrating a typical machine of this type, we have shown the invention as applied to a corn picker disclosed in the patent granted S. T. Ekholm, January 21, 1947, No. 2,414,512.

In the form illustrated, the invention is part of a harvesting machine which advances along a row of growing stalks of corn, and simultaneously cuts each stalk near the ground by cutters which are not shown, and advances it to and through a device for separating the ears from the stalks and discharges each separately.

Thus, the machine denoted generally by 11, is supported on a pair of wheels 12 mounted on opposite ends of a U-shaped axle 13. The axle is adjustably carried in bearings 14, one end 15 of the axle is held up by a hand-operated screw-bar so that the elevation of the frame is variable. In this way the height of cutting of the stalks is predetermined.

One wheel carries a sprocket 16 around which a chain 17 is trained. The chain connects with a second sprocket 18 on a transverse shaft 19. This shaft has bevel gearing 20 forming part of a drive shaft 21 by which the sickle (not shown) is operated.

The shaft 19 carries two spaced bevel gears of which only one is shown, each operating an inclined shaft 22. The shafts 22 serve in known manner to actuate a pair of spaced parallel conveyer belts 23, 23 between which the stalks are supported during cutting by the sickle and then advanced toward the corn stripping or snapping means. The upper ends of these belts are supported on sprockets 24 carried by spaced brackets 25 depending from a slotted platform 26 of the machine proper.

The belts 23, 23 are aligned with a pair of belts 27, 27 carried by pulleys 28, 28 and small idler pulleys 29, 29 all mounted on the platform 26. The belts 27, 27 are in substantial contact and may be provided with special gripping surfaces or V-shaped cross-sections by which the stalks are firmly engaged and advanced.

Suitable driving means for the pulleys 28, 28 consists of vertical shafts 30, 30 connected with pulleys and carrying sprockets 31, 31. One of the latter has a chain 32 to another sprocket 33 on the upper end of vertical shaft 34. The lower end of shaft 34 is connected by bevel gears 35 to a transverse drive shaft 36.

Shaft 36 is driven through a second bevel gear set 37 and a drive shaft 38 leading from a power means which may be a tractor or the like.

A transversely arranged endless belt 39 underlies the platform 26 and is driven from the transverse shaft 36 by shaft 40.

Interposed between the belt 39 and the platform 26 there is provided means for drawing the cornstalks longitudinally by their tassel ends and at the same time snapping off the ears of sweet corn.

Two parallel bearing brackets 41, 42 are suspended horizontally from platform 26 and beneath the belts 27, 27.

A bearing plate 43 is supported from the side of the machine frame below and parallel to the brackets 41, 42.

A pair of snapping rolls 44 are journaled in parallel arrangement between the free ends of the brackets 41, 42 and the plate 43.

Inwardly of the rolls 44 there is a pair of parallel drawing rolls 45, 46 also journaled between the brackets and the plate.

A second pair of parallel drawing rolls 47, 48 are also journaled between the brackets and the plate inwardly of the first drawing rolls. The drawing rolls of each pair are in contact but may be resiliently mounted to expand and allow a corn stalk to be gripped and fed between each pair of rolls.

Figure 5:
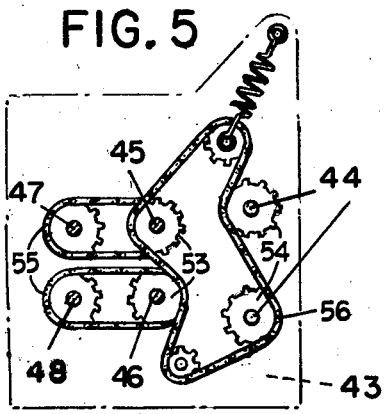
Fig. 5 is an enlarged cross-section of the driving means taken on line 5—5 of Fig. 2.

As shown on Fig. 5, the several pairs of rolls are equipped on their lower ends beneath the plate 43 with toothed gears 53 and 54 and interconnecting sprocket chains 55 and 56.

One gear has a bevel face 49 by which it is driven from the transverse drive shaft 36.

Figure 4:
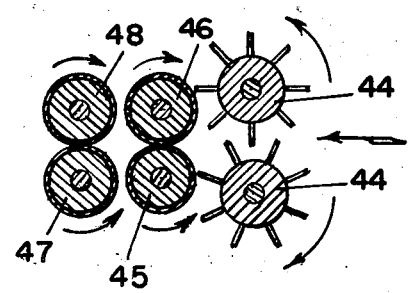
Fig. 4 is an enlarged inclined cross-section of the same taken on line 4—4 of Fig. 2.

The several pairs of rolls are so connected that the two pairs of drawing rolls turn inwardly and toward the rear of the machine as shown by the arrows in Fig. 4, to grip the stalks and draw them through the device. At the same time the snapping rolls rotate inwardly and to the front of the machine against the direction of travel of the stalks to engage the ears of soft corn and bend them outwardly until they snap off of the stalks and fall on the conveyer belt 39.

If desired the brackets 41, 42 and plate 43 may be offset to allow all rolls to be in the same horizontal plane.

Figure 2:
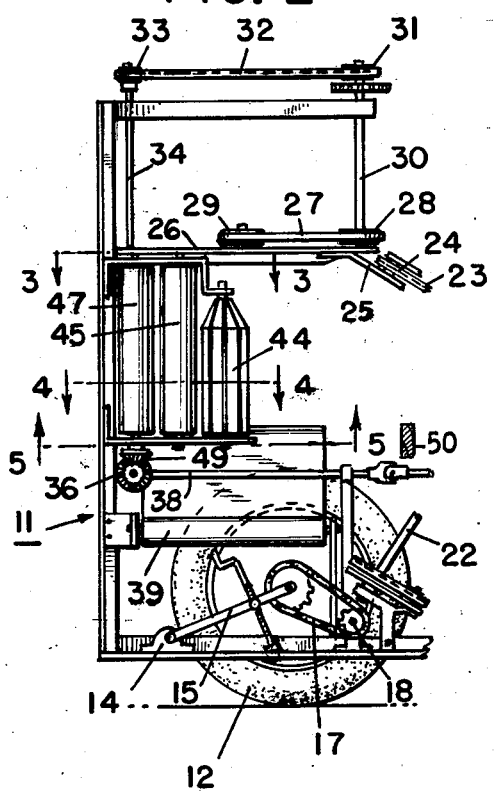
Fig. 2 is a side elevation of the same.

A transverse bar 50 is provided beneath the belts 23 sufficiently far enough in advance of the rolls 44 to cause the stalks to be tilted into a position substantially perpendicular to the rolls (see Figs. 2 and 9).

In Fig. 9 we have shown diagrammatically the operation of the machine. As the belts grasp the tassel ends of a stalk 51, and after it has been cut at the base, by cutters which are not shown, the stalk is advanced toward the snapping device. In the first movement the butt end of the stalk strikes the cross-bar 50, and is tilted upwardly to follow the tassel end.

The stalk is thus given an inclination such that it is fed between the pairs of rolls substantially lengthwise of the stalk. This greatly improves the presentation of the ears 52 to the snapping rolls. The most efficient presentation of the ears is lengthwise with the tip end foremost so that they will be diverted by the blades of the snapping rolls. Such contact minimizes the possibility of damaging the full size kernels. It approximates the motions used in manual operation of picking the ears from the stalks.

Before the ears reach the snapping rolls, the upper end of the stalk will have been grasped between both pairs of the drawing rolls. This is emphasized in Fig. 6. It ensures that the stalk shall be held lengthwise in the direction of travel. As a consequence the ear is snapped off without the stalk being bent to one side, as would be likely where the grip by a single pair of drawing rolls forms a fulcrum around which the stalk can be bent by the blows of the snapping roll blades and the reaction of the ears which may break the stalk above the junction with the ear. The final position at the moment when the ears are separated from the stalk is shown at Fig. 7. The direction of travel is apparent from Fig. 8.

It has been found that the arrangement of two consecutive pairs of drawing rolls maintains the stalk in the straight-line direction of travel and withstands the tendency of the stalk to yield laterally from the action of the snapping rolls. Thus the latter have a greater effect in snapping of the ears with an engagement primarily at the tips of the ears. Also the two pairs of drawing rolls insure the frictional grip on the stalks.

In presenting the stalks to the rolls there is a tendency for the stalks to rise as they go through the rolls. This can be checked to a material degree however if the stalks are presented as nearly as possible in a position perpendicular to the rolls, i. e., endwise. The provision of the crossbar is an advantage as it tilts the stalk and thus presents the latter and the ears lengthwise or perpendicular to the rolls.

The essential features of our novel mechanism have been outlined above. However, it will be obvious that the details of the structure, its material and proportions can be varied in numerous respects within the scope of the appended claims.

What we claim is:

1. A picker for ears of soft corn comprising a portable frame, conveying means for horizontally conveying cut stalks of corn suspended by their tassel ends, a pair of ear-snapping rolls through which the stalks are drawn by the conveying means tassel-end foremost, a pair of drawing rolls engaging the stalks tassel-end foremost as they pass beyond the snapping rolls and a second pair of drawing rolls beyond the said first pair and on the continuation of the common tangent of the snapping rolls and the first drawing rolls.

2. A picker for ears of soft corn comprising a portable frame, conveying means for horizontally conveying cut stalks of corn suspended by their tassel ends, a rigid transverse bar against which the lower portions of the cut stalks are conveyed for tilting the stalks into substantially horizontal position with their tassel-ends foremost, a pair of ear-snapping rolls through which the stalks are drawn by the conveying means, a pair of drawing rolls engaging the stalks tassel-end foremost as they pass beyond the snapping rolls and a second pair of drawing rolls beyond the said first pair of drawing rolls and in line with the direction in which the stalks pass from the said second pair.

3. A picker for ears of soft corn comprising a portable frame, a conveyer for horizontally conveying cut stalks of corn suspended vertically from their tassel-ends, a rigid transverse bar against which the lower portions of the cut stalks are conveyed for tilting the stalks into substantially horizontal position with their tassel-ends foremost, a pair of ear-snapping rolls through which the stalks are drawn by the conveyer, a pair of drawing rolls engaging the stalks tassel-end foremost as they pass beyond the snapping rolls and a second pair of drawing rolls arranged with their axes parallel to and beyond the first pair and on opposite sides of the line of travel of the stalks through the snapping rolls and the first pair of drawing rolls.

JOHN D. BARNARD.
ALTON LEVERSON.

REFERENCES CITED

The following references are of record in the file of this patent:

UNITED STATES PATENTS

| Number | Name | Date |
| --- | --- | --- |
| 712,976 | Steele | Nov. 4, 1902 |
| 1,001,577 | Breen | Aug. 22, 1911 |
| 2,414,512 | Ekholm | Jan. 21, 1947 |